United States Patent [19]

Merval et al.

[11] Patent Number: 5,409,999
[45] Date of Patent: Apr. 25, 1995

[54] POLYAMIDE AND/OR POLYETHERESTERAMIDE THERMOPLASTIC POWDER COATING COMPOSITIONS COMPRISING EPOXY/SULFONAMIDE RESINS

[75] Inventors: Jean-Paul Merval, Brionne; Eric Perraud, Bernay, both of France; Stephen Rennie, Winslow, England

[73] Assignee: Elf Atochem S.A., Paris, France

[21] Appl. No.: 106,643

[22] Filed: Aug. 16, 1993

Related U.S. Application Data

[63] Continuation-in-part of Ser. No. 566,497, Aug. 13, 1990, abandoned.

[51] Int. Cl.⁶ .............................. C08L 77/00
[52] U.S. Cl. ................. 525/423; 525/420; 525/434
[58] Field of Search ............. 525/423, 420, 434

[56] References Cited

U.S. PATENT DOCUMENTS

| | | | |
|---|---|---|---|
| 3,899,546 | 8/1975 | Stoy et al. | 525/423 |
| 4,389,501 | 6/1983 | Burris et al. | |
| 4,528,359 | 7/1985 | Berman et al. | |
| 5,055,530 | 10/1991 | Inoue | 525/423 |

FOREIGN PATENT DOCUMENTS

| | | |
|---|---|---|
| 39332 | 4/1978 | Japan. |
| 53946 | 3/1983 | Japan. |

OTHER PUBLICATIONS

Chemical Abstracts, vol. 80, No. 12, 25 Mar. 1973, p. 73, Resume No. 61147b, Columbus, Ohio, U.S.

*Primary Examiner*—Ana L. Carrillo
*Attorney, Agent, or Firm*—Burns, Doane, Swecker & Mathis

[57] ABSTRACT

Thermoplastic powder coating compositions including a polyamide and/or polyetheresteramide constituent and an epoxy/sulfonamide resin constituent are well adapted for coating a wide variety of metal substrates, e.g., by electrostatic spraying, without the requirement for first treating such substrates with an adhesion primer.

12 Claims, No Drawings

POLYAMIDE AND/OR POLYETHERESTERAMIDE THERMOPLASTIC POWDER COATING COMPOSITIONS COMPRISING EPOXY/SULFONAMIDE RESINS

CROSS REFERENCE TO RELATED APPLICATIONS

This application is a continuation-in-part of application Ser. No. 07/566,497 filed Aug. 13, 1990, now abandoned.

BACKGROUND OF THE INVENTION

1. Field of the Invention

The present invention relates to novel thermoplastic powder compositions based on polyamides and/or polyetheresteramides which are especially adapted for coating metal substrates without the requirement for any adhesion primer.

2. Description of the Prior Art

The polyamides are commonly employed for coating metal substrates, especially because of their good mechanical properties such as abrasion resistance, impact strength, and the like, and chemical inertness towards many materials such as hydrocarbons, bases, inorganic acids, etc.

It is known to this art, however, that the adhesiveness of the polyamides to metals is insufficient because of the poor wetting ability of the polyamides in the molten state, which does not permit them to penetrate well into the roughness and interstices of the metal in order to provide an adhesiveness of mechanical order.

Furthermore, when a uniform deposit of polyamide powder is provided over an entire metal surface and when this deposit is heated until it melts at the appropriate temperature, the molten polyamide film shrinks and coheres together in droplets which can fall or drop off of the metal substrate.

To overcome this drawback the metal substrate is coated with an undercoat, designated an adhesion primer, intended to ensure the bonding and the mechanical anchoring of the polyamide powder. The adhesion primer employed is generally based on thermosetting resins and is applied in the form of a powder, or in solution or suspension in organic solvents.

Additional equipment must therefore be provided for possible removal of the solvents and for curing the primer before the substrate thus coated is clad with the polyamide powder. Moreover, the curing and/or the drying of the primer results in an appreciable increase in the duration of the coating operations and, hence, in their cost.

French Patent No. 72/41,484 describes powder compositions based on polyamide containing blocked phenols that do not require the use of an adhesion primer. However, the application conditions are intricate and it is impossible to obtain high-performance adhesiveness results, although they are indeed improved.

SUMMARY OF THE INVENTION

Accordingly, a major object of the present invention is the provision of improved thermoplastic powder compositions based on polyamides and/or polyetheresteramides having the capability of thoroughly wetting metal substrates and effecting high-performance adhesiveness results without the requirement for applying any adhesion primer to the substrate to be coated.

Briefly, the thermoplastic powder coating compositions of the present invention comprise admixture of polyamide and/or of polyetheresteramide and of aromatic epoxy/sulfonamide resins.

DETAILED DESCRIPTION OF THE PREFERRED EMBODIMENTS OF THE INVENTION

More particularly according to the present invention, the weight ratio of the epoxy/sulfonamide resins to the polyamide and/or polyetheresteramide advantageously ranges from 0.5% to 20%, and preferably from 2% to 7%.

By the "polyamide" constituent of the thermoplastic powder composition of the invention is intended an aliphatic polyamide prepared from lactams or from amino acids, the hydrocarbon chain of which has from 4 to 20 carbon atoms, such as, for example, caprolactam, oenantholactam, dodecalactam, undecanolactam, 11-aminoundecanoic acid, 12-aminododecanoic acid, the products of condensation of a dicarboxylic acid with a diamine such as, for example, polyamides 66, 69, 610, 612 and 96 (products of condensation of hexamethylenediamine with adipic acid, azelaic acid, sebacic acid, 1,12-dodecanedioic acid and of nonamethylene-diamine with adipic acid), copolyamides resulting from the polymerization of the various monomers indicated above or mixtures of a plurality of the above polyamides.

Exemplary of such polyamides, particularly representative are:

(i) polyamide 11, prepared by polycondensation of 11-aminoundecanoic acid;

(ii) polyamide 12, prepared by polycondensation of 12-aminododecanoic acid or of dodecanolactam; and (iii) the copolyamides prepared by copolymerization of the monomers indicated above.

In general, the inherent viscosity (measured at 20° C. using a solution containing 0.5 g of polymer per 100 g of meta-cresol) of the polyamides advantageously ranges from 0.20 to 2.0, and preferably from 0.60 to 1.30 dl $g^{-1}$.

By "polyamide" are also intended the semiaromatic amorphous polyamides, and especially those such as described in French Patents FR 1,588,130, 2,324,672 and 2,575,756, in European Patent EP 53,876 and in Japanese Patents 59/015,447 and 60/217,237.

By "polyetheresteramide" are intended both random polyetheresteramides (namely, those formed by the random chain sequencing of the various monomeric constituents) and block polyetheresteramides, namely, those formed of blocks exhibiting a certain chain length of the various constituents.

The polyetheresteramides are products of the copolycondensation of polyamide blocks having reactive endgroups with polyether blocks having reactive endgroups, such as:

polyamide blocks having dicarboxylic acid endgroups with polyetherdiol blocks.

Polymers of this type are described, for example, in French Patents No. 74/18,913 and 77/26,678 and U.S. Pat. Nos. 4,230,838, 4,331,786 and 4,332,920, hereby expressly incorporated by reference.

The number-average molecular weight of the polyamide blocks typically ranges from 500 to 10,000 and more particularly from 600 to 5,000. The polyamide blocks of such polyetheresteramides are preferably comprised of polyamide 6, 66, 612, 11 or 12 or of copolyamides prepared by copolycondensation of the constituent monomers of the above polyamides.

The number-average molecular weight of the constituent polyethers generally ranges from 200 to 6,000 and more particularly from 600 to 3,000.

The polyether blocks are preferably polytetra-methylene glycol (PTMG), polypropylene glycol (PPG) or polyethylene glycol (PEG).

The inherent viscosity of such polyetheresteramides advantageously ranges from 0.8 to 2.05 and preferably from 0.80 to 1.20.

The inherent viscosity is measured in metacresol at 20° C. using an initial concentration of 0.5 g of polymer per 100 g of meta-cresol. It is expressed in dl $g^{-1}$.

The polyetheresteramides according to the invention may comprise 5% to 85% by weight of polyether and of 95% to 15% by weight of polyamide, and preferably 30% to 80% by weight of polyether and 70% to 20% by weight of polyamide.

The epoxy resins are solid or liquid polymers which contain at least one epoxide functional group, used either alone or in admixture.

The mixtures may include compounds which have a different number of epoxide functional groups and which very frequently have an overall (epoxy) functionality which is not integral.

A very large number of examples of organic compounds corresponding to this definition, the structures of which are very diverse, are presently commercially available and are widely described in the patent and technical literature. The most widely used compounds are those derived from the reaction of bisphenol A with epichlorohydrin and especially the compounds resulting from the addition of two molecules of epichlorohydrin to one molecule of bisphenol A (BADGE). However, a large number of other epoxy resins can be employed, such as those produced by the attachment of an epoxide group to both ends of a paraffinic hydrocarbon chain (for example, diepoxides derived from butanediol) or of a polyether chain, such as alpha,omega-diepoxy polypropylene glycol. More exotic diepoxy compounds may also be used, such as vinylcyclohexene dioxide, 3,4-epoxycyclohexylmethyl 3,4-epoxycyclohexanemonocarboxylate, 3-(3,4-epoxycyclohexyl)-8,9-epoxy-2,4-dioxaspiro[5.5]undecane, bis(2,3-epoxycyclopentyl) ether, bis(3,4-epoxy-6-methylcyclohexyl) adipate and resorcinol diglycidyl ether.

If it is desired to produce a final product exhibiting a high crosslinking density, it may then be advantageous to employ epoxy compounds containing more than two epoxide functional groups per molecule, such as epoxidized soya oils, polyglycidyl ethers of phenolic resins of the novolak type, p-aminophenoltriglycidyl ether or 1,1,2,2-tetra(p-hydroxyphenyl)ethane tetraglycidyl ether.

The epoxy equivalent weight generally ranges from 43 to 5,000 and preferably from 150 to 1,000.

The epoxy resins which are the preferred are those having an overall functionality ranging from 1.9 to 2.1 and which advantageously is equal to 2.

The aromatic sulfonamide compounds may be selected from among the monosulfonamide derivatives of benzene, halogenated or otherwise, such as benzenesulfonamide, nitro-benzenesulfonamide, ortho-, meta- or para-toluenesulfonamide, aminoalkylbenzenesulfonamides, naphthalene or xylenesulfonamide.

The epoxy/sulfonamide resins according to the invention can be prepared by reaction of sulfonamide compounds with epoxy compounds.

The proportion of the epoxy and sulfonamide compounds must be such that the number of epoxide functional groups is equal to the number of sulfonamide functional groups.

However, for reasons of reaction kinetics and/or of final product quality, it may be necessary to vary the stoichiometric ratio (number of sulfonamide functional groups/number of epoxide functional groups) from 0.25 to 1 and preferably from 0.5 to 1.

The melting point of the epoxy/sulfonamide resins in accordance with the invention typically ranges from 50° to 180° C. and their weight-average molecular weight Mw generally ranges from 500 to 10,000.

Various other constituents may be incorporated into the mixtures described above, such as fillers, pigments, additives such as antipitting or reducing agents, antioxidants, and the like.

Exemplary fillers which may be formulated into the compositions according to the invention are talc, calcium and manganese carbonates and potassium and aluminum silicates.

Exemplary pigments which may thus be formulated are titanium dioxide, strontium chromate, zinc phosphate, lead silicochromate, carbon black and iron oxides.

Various constituents may be incorporated into the above mixtures of polyamide and/or of polyetheresteramide and of epoxy/sulfonamide resins, these constituents being selected from among those described above and whose corresponding proportions remain within the limits typically encountered in the art of powder compositions based on polyamide or polyetheresteramide for coating metal substrates. In general, up to 100% by weight of said constituents is incorporated.

This invention also features several processes for producing the powder thermoplastic compositions described above.

One such process entails:

(a) dissolving the epoxy/sulfonamide resin(s), hereinafter simply the "epoxy/sulfonamide resin", in a suitable solvent.

(b) then adding to the solution thus obtained the powdered polyamide and/or polyetheresteramide, hereinafter simply the "polyamide", and (c) lastly, drying and screening of the mixture to produce a powder composition having the desired particle size range.

All of the above stages can be carried out at room temperature.

The solvent in which the epoxy/sulfonamide resin is dissolved is advantageously selected from among the ketones such as acetone, esters, or any other solvent in which the resin is highly soluble and which can be removed easily according to the usual techniques known to this art.

A second process for producing the power compositions of the invention entails melt-blending the epoxy/sulfonamide resin with the polyamide in a kneader of suitable type.

The blending temperature may range from 150° to 300° C., and preferably ranges from 170° to 230° C.

The mixture thus obtained is generally in the form of granules, which are milled according to the known techniques, to the desired particle size range for coating metal substrates.

A third process entails dry-mixing the epoxy/sulfonamide resin, finely milled beforehand, and the polyamide powder. This dry-mixing or dry-blending does not require any special apparatus; it can be carried out at room temperature and is therefore economical and rapid.

A fourth process for formulating the powder compositions of the invention entails conducting a (co)-polycondensation of the polyamide monomers in the presence of the epoxy/sulfonamide resin described above.

The operation is typically carried out at a temperature ranging from 150° to 300° C., and preferably from 190° to 250° C.

Any type of apparatus used for the polycondensation of polyamides may advantageously be used. For example, a reactor adapted for stirring at approximately 50 revolutions/min, and capable of withstanding a pressure of 20 bars, may be used.

The polycondensation may be carried out for from 5 to 15 hours and preferably from 4 to 8 hours.

When the copolycondensation operations are completed, the mixture is obtained in the form of granules which are milled to the desired particle size range.

The particle size of the powders in accordance with the invention advantageously ranges from 5 $\mu$m to 1 mm.

The present invention also features the use of the thermoplastic powder compositions described above for coating of metal substrates.

The metal substrate may be selected from among a wide range of products. These may be ordinary or galvanized steel components, or components fabricated of aluminum or aluminum alloys. The metal substrate may be of any thickness (for example on the order of one-tenth of a mm, or on the order of several tenths of a cm).

According to a known technique, the metal substrate, and especially one made of ordinary steel, aluminum or aluminum alloy which is present in the materials in accordance with the invention, may have been subjected to one or more of the following surface treatments, given by way of example only:

(i) rough degreasing;
(ii) alkaline degreasing;
(iii) brushing;
(iv) fine degreasing;
(v) hot rinsing;
(vi) phosphating degreasing;
(vii) iron or zinc phosphating;
(viii) chromating;
(ix) cold rinsing;
(x) chromic rinsing.

Exemplary metal substrates which are suitable for coating with a composition according to the invention are:

(i) degreased, smooth or shot-blasted steel;
(ii) degreased, phosphated steel;
(iii) iron or zinc phosphate-treated steel;
(iv) Sendzimir galvanized steel;
(v) zinc-electroplated steel;
(vi) dip-galvanized steel;
(vii) electrophoresis steel;
(viii) chromated steel;
(ix) anodized steel;
(x) carborundum-sanded steel;
(xi) degreased aluminum;
(xii) smooth or shot-blasted aluminum;
(xiii) Alodine 1200 aluminum.

The polyamide or polyetheresteramide-based compositions according to the invention are therefore deposited onto the metal substrate in the form of a powder. The application of the powder composition can be carried out according to the techniques usually employed in this art.

The powder milling can be carried out in apparatus cooled cryogenically or with high air intake (impeller, hammer, disc and similar mills). The powder particles obtained are suitably classified to remove the undesired particle size fractions: for example, too coarse and/or too fine articles.

Among the techniques for suitably applying the powder, exemplary are electrostatic spraying and fluidized bed dip-coating, techniques which are particularly preferred for conducting the coating of metal substrates according to the invention.

In electrostatic spraying, the powder is introduced into a gun where it is propelled by compressed air and is sprayed through a nozzle at a high voltage, generally ranging from about ten to about one hundred kilovolts.

The applied voltage may be positive or negative in polarity.

The flow rate of the powder through the gun typically ranges from 10 to 200 g/min and preferably from 50 to 120 g/min.

When it is sprayed through the nozzle, the powder becomes charged with a certain amount of electricity and the powder particles conveyed by the compressed air are applied onto the metal surface to be coated, said surface being itself connected to ground, i.e., a zero electrical potential. The powder particles are secured onto this surface by their electrostatic charge and the forces of electrostatic attraction are sufficient that the powder-treated substrate is not coated with the powder, but also can be transported and heated in an oven to a temperature which causes the coating powders to melt or to crosslink.

The polarity of the electrostatic charge imparted to the powder may be, as above indicated, positive or negative.

It is generally selected as a function of the nature of the powder sought to be applied, which can give good results with a polarity of a certain sign and less good or even no results when the polarity is of opposite sign.

In general, positive polarity gives better results for the deposition of polyamide 11 or 12 powder by electrostatic spraying.

However, it has also been determined that in the case of the powder compositions according to the invention, based on polyamide and containing epoxy/sulfonamide resin, the adhesiveness results and the final coating quality are practically independent of the polarity of application and are (appreciably) identical.

Electrostatic spraying of the polyamide-based compositions according to the invention presents a certain advantage, regardless of the polarity of application, particularly because it will be possible to employ existing standard industrial plants which are designed for the electrostatic spraying of a powder coating with a single polarity.

In electrostatic spraying, the preferred weight ratio of epoxy/sulfonamide resin present in the polyamide mixture advantageously ranges from 1.5 to 7.5%.

A powder having a mean particle size ranging from 5 to 100 $\mu$m and preferably from 5 to 65 $\mu$m will typically be employed.

The coatings produced from any one of the compositions according to the invention and applied by electrostatic spraying have good adhesive properties and a good quality final appearance, whatever the thickness of such coating which typically ranges from 40 to 400 μm.

This is not the case using powder coatings based on polyamide alone, which exhibit numerous faults in appearance either at low or high thicknesses.

By "low thicknesses" are intended thicknesses of about 40 μm, and "high thicknesses" are those on the order of 400 μm.

For example, in the case of low thicknesses, a polyamide coating exhibits pitting; in the case of high thicknesses, there are considerable risks of coating delamination and bubbles and "molehills" appear in large numbers.

In the case of the fluidized bed dip-coating process, the metal substrate to be coated, carefully prepared, for example by subjected it to one or more of the surface treatments indicated above and preferably to a shot-blasting operation, is heated in an oven to a specified temperature depending especially on the nature of said substrate, its form and the desired coating thickness. Thus heated, the substrate is then immersed in a powder composition according to the invention which is maintained in suspension by a gas circulating in a vessel having a porous base. The powder melts in contact with the hot metal surfaces and thus forms a deposit, the thickness of which is a function of the temperature of the substrate and of the duration of its immersion in the powder.

In fluidized bed dip-coating, the preferred proportion of epoxy/sulfonamide resin relative to the weight of polyamide advantageously ranges from 1 to 5%.

The particle size of the powders used in a fluidized bed typically ranges from 10 to 1,000 μm and preferably from 80 to 220 μm.

The coating thickness typically ranges from 150 to 1,000 μm and preferably from 200 to 700 μm.

In order to further illustrate the present invention and the advantages thereof, the following specific examples are given, it being understood that same are intended only as illustrative and in nowise limitative.

EXAMPLE 1

(A) PREPARATION OF THE POWDER COMPOSITION 6 parts of an aromatic epoxy/sulfonamide resin with Mw=1,200 and glass transition temperature Tg=54° C. were dissolved in 100 parts by weight of acetone.

The epoxy compound was a resin produced by the reaction of bisphenol A with epichlorohydrin.

The epoxy equivalent weight of this resin was 175 g and its hydroxyl content was 0.11 hydroxyl equivalents per kg of resin.

The sulfonamide compound was paratoluenesulfonamide.

200 parts of powder were then added, of polyamide 11 having an inherent viscosity of 0.9 and containing 13% by weight of various additives, including 9.6% of filler, 1.8% of colorants and 1.6% of antioxidant, antipitting and reducing agents. The mixture was stirred continuously for 4 minutes at room temperature. A paste was obtained, which was dried for 5 hours in an oven at 40° C. to remove the acetone.

The dry residue was powdered and screened through a 100 μm mesh sieve to remove the coarse particles which did not correspond to the particle size required for electrostatic powders.

(B) APPLICATION

The powder composition obtained in A was deposited at room temperature using negative (a) or positive (b) electrostatic spraying at 30 kV onto a steel panel which had previously been subjected to a degreasing operation, followed by shot-blasting, the metal surface being at zero potential.

Thus coated, the substrate was placed in an oven maintained at 220°±20° C., where it was maintained for 5 to 15 minutes; it was then removed from the oven and cooled in air.

(C) CHARACTERISTICS OF THE MATERIAL (1) The material was a composite comprising, successively:

(i) a degreased and shot-blasted steel panel (1.5 mm thick);

(ii) a layer of powder composition as described under A, 100 μm thick.

(2) The material described in (C)(1) was subjected to the following adhesiveness test, developed by the assignee hereof:

(a) 2 parallel grooves 10 mm apart were scribed into the coating to the depth of the metal, using a cutter. Another like groove, perpendicular to the first 2 and intersecting them was then scribed.

(b) Using the same tool, whose cut width was 10 mm, the latter groove was entered and a forward movement was applied between the 2 parallel grooves at the metal/coating interface to obtain a 10 mm coating flap.

(c) The flap was then pulled in an attempt to separate the coating from the metal.

The results were classified as follows:

Class 4: the film could not be separated from the metal,

Class 3: the film parts was separated nonuniformly, the bonding being complete over at least 50% of the surface, Class 2: the film was separated uniformly, the force required to remove it being high and was at the strength limit of the coating, Class 1: the film was separated from the surface easily, the bonding being weak, Class 0: the coating exhibited no bonding to the surface.

(3) The spreading of the powder composition applied to a 100 * 100 * 1 mm steel panel was assessed visually when it was melted at 220° C., the panel being placed vertically in the oven.

A score of from 0 to 4 was given according to the following observations:

Class 0: no coating remained on the panel. All of the molten coating had fallen off in the oven, Class 1: at least half of the coating had fallen off during the melting, leaving bare approximately half of the surface area of the metal panel, Class 2: there were a few points of coating separation (generally at the edges and the corners of the panels), Class 3: no separation; faults due to poor wetting: bubbles, large craters, etc., Class 4: the coating was tight and showed no wetting or spreading fault.

The adhesiveness and spreading results obtained using the material described in (C)(1) are reported in Table I.

Note: the half-score values correspond to properties which were intermediate between the classifications between which they lie. For example: a score of 1.5 corresponded to properties which were intermediate between those of Class 1 and those of Class 2.

EXAMPLE 2

The test of Example 1 was repeated, using a mixture comprising (by weight):
(i) 100 parts of acetone,
(ii) 6 parts of epoxy/sulfonamide resin having the same characteristics as those described in Example (1)(A),
(iii) 200 parts of powder of polyamide 12 and of co-polyamide 6/12 having an inherent viscosity of 0.96 and containing 12% of various additives, including 11.3% of filler and 0.7% of antioxidant and reducing agents.

A composite material was thus produced, comprising, successively:
(a) a zinc phosphate-treated steel panel 1.5 mm thick,
(b) a layer of polyamide 12, 6/12, 120 lm thick.

The material described above was subjected to an adhesiveness test as defined in (1)(C)(2) and to a spreading assessment as defined in (1)(C)(3).

The results are reported in Table I.

EXAMPLE 3

(A) PREPARATION OF THE POWDER COMPOSITION 30 parts by weight of epoxy/sulfonamide resin having characteristics which were identical to those of Example (1)(A), milled beforehand to an average particle size ranging from 5 to 40 $\mu$m were added to 1,000 parts of PA 11 having an inherent viscosity of 0.90 and containing 13.8% of additives, including 11.3% of fillers.

The entire mass was blended and homogenized at a temperature ranging from 100° to 220° C. The residence time in the blending apparatus was on the order of 45 s.

Once cooled in the open air, the product obtained was milled to provide a powder particle size ranging from 10 to 80 $\mu$m.

(B) APPLICATION

The powder composition obtained under A was sprayed electrostatically onto a steel panel under the same conditions as those described in Example (1) (B).

(C) CHARACTERISTICS OF THE MATERIAL (1) The material was a composite comprising, successively:
(i) a degreased and shot-blasted steel panel (1.5 mm thick),
(ii) a layer of powder composition as described under A, 100 $\mu$m thick.

(2) The material described in (C)(1) was subjected to adhesiveness and spreading tests as defined in Example (1)(C)(2) and (1)(C)(3).

The results obtained using the material described in (C)(1) are reported in Table I.

EXAMPLE 4

The test of Example 3 was repeated using a mixture comprising:
(i) 30 parts by weight of epoxy/sulfonamide resin having characteristics which were identical with those of Example (1)(A) milled beforehand to a particle size ranging from 5 to 40 $\mu$m, added to 1,000 parts of polyamide 12 having an inherent viscosity of 0.95.

The entire mass was blended and homogenized at a temperature ranging from 180° C. to 230° C. The residence time in the blending apparatus was on the order of 45 s.

Once cooled, the product obtained was milled cryogenically in order to provide a powder particle size ranging from 10 to 80 $\mu$m.

A composite material was thus produced comprising, successively:
(i) a degreased, shot-blasted steel panel, 1.5 mm thick,
(ii) a layer of polyamide 12, 100 $\mu$m thick.

The material thus described was subjected to the adhesiveness and spreading tests specified in (1) (C) (2) and (1) (C) (3).

The results are reported in Table I.

EXAMPLE 5

(A) PREPARATION OF THE POWDER COMPOSITION 20 kf of PA 11 powder, 0.6 kg of epoxy/sulfonamide resin milled to an average particle size of 10 $\mu$m and 0.02 kg of fluidization agent were charged into a Henschel-type fast blender.

The PA 11 employed had an inherent viscosity of 0.90 and contained 13.8% of additives, including 11.3% of pigments and fillers and 2.5% of antioxidant, antipitting and reducing agents.

The epoxy/sulfonamide resin had a weight-average molecular weight Mw=1,200 and a glass transition temperature Tg=54° C.

The mixture was stirred for 100 s at a speed of 830 rev/min. The powder obtained could be applied as such.

(B) APPLICATION

The powder composition obtained under A was sprayed electrostatically onto a steel plate under the same conditions as those described in Example (1) (B).

(C) CHARACTERISTICS OF THE MATERIAL (1) The material was a composite comprising, successively:
(i) a degreased and shot-blasted steel panel (1.5 mm thick),
(ii) a layer of powder composition as described under A, 100 $\mu$m thick.

(2) The material described in (C)(1) was subjected to adhesiveness and spreading tests as defined in Example (1) (C) (2) and (1) (C) (3).

The results obtained using the material described in (C)(1) are reported in Table I.

EXAMPLE 6

A composition of $\frac{1}{3}$ by weight of polyamide 12 and $\frac{2}{3}$ of copolyamide 6/12, the PA 12 being encapsulated in the PA 6/12, and of various additives, including 11.3% of pigments and fillers and 0.7% of antioxidant and reducing agents, and of 3% of epoxy/sulfonamide resin milled according to the characteristics given in Example 5 was sprayed electrostatically onto a degreased and shot-blasted steel panel under the same conditions as those of Example (5) (B).

A composite material was thus produced comprising, successively:

(i) a degreased and shot-blasted steel panel, 1.5 mm thick, (ii) a layer of polyamide 12 and 6/12, 100 μm thick.

The material described above was subjected to the adhesiveness and spreading tests as defined in (1) (C) (2) and (1) (C) (3).

The results obtained are reported in Table I.

EXAMPLE 7 (COMPARATIVE)

(1) A PA 11 powder having the same characteristics as those described in Example (5)(A) and having an average particle size of 35 μm was sprayed electrostatically onto a smooth degreased steel panel under the same conditions as those of Example (1)(B).

(2) The material obtained was a composite comprising, successively:

(i) a smooth degreased steel panel (1.5 mm thick), (ii) a layer of PA 11 powder, 100 μm thick.

(3) The material described in (2) was subjected to an adhesiveness test as defined in Example (1) (C) (2).

The adhesiveness results are reported in Table I.

EXAMPLE 8 (COMPARATIVE)

(1) A powder composition based on PA 11 whose characteristics were identical with those described in Example (5)(A) and containing 13.5% by weight of blocked phenolic resins was sprayed electrostatically onto a smooth degreased steel panel under the same conditions as those of Example (1)(B).

(2) The material obtained was a composite comprising, successively:

(i) a smooth degreased steel panel (1.5 mm thick), (ii) a layer of powder composition as defined in (1), 100 μm thick.

(3) The material described in (2) was subjected to the adhesiveness and spreading tests as defined in Example (1) (C) (2) and (1) (C) (3).

The results are reported in Table I.

EXAMPLE 9

The test of Example 5 was repeated under the same conditions using PA 11 powder with the same characteristics but containing different additives:

A—the powder employed contains:

—99.25% by weight of PA 11

—0.75% of additives (antioxidant agents, antipitting agent and fluidization agent).

B—The white-colored powder employed contains 68.8% by weight of PA 11, 29.5% of fillers and 1.7% of additives (antioxidant agent and antipitting agent).

C—The black-colored powder employed contains 58.5% by weight of PA 11, 39% of fillers, 0.5% of black pigment, 2% of additives (antioxidant agent, adhesion promoter).

D—The grey-colored powder employed contains 85.3% by weight of PA 11, 13.5% of pigments and fillers and 1.2% of additives (antioxidant agent, antipitting agent).

E—The yellow-colored powder employed contains 67.4% by weight of PA 11, 28.9% of fillers, 1.7% of colorants and 2% of additives (antioxidant agent, antipitting agent, reducing agent).

The adhesiveness and spreading results obtained for tests A to E are combined in Table II.

EXAMPLE 10

The test of Example 5 is repeated under operating conditions which are identical by using grey-colored PA 11 powder contains 13% by weight of additives including 11.4% of pigments and fillers and 1.6% of antioxidant, antipitting and reducing agent (10.A).

The following compositions also contain 0.2 kg (10.B), 0.6 kg (10.C) and 1 kg (10.D) of epoxy/sulphonamide resin respectively per 20 kg of PA 11 powder described above.

EXAMPLE 11

A—The powder composition obtained in Example 10 (Sample 10.C) is applied electrostatically onto various metal substrates under operating conditions which are identical with those described in Example 1.B.

B—The powder composition obtained in Example 6 is applied electrostatically under the same conditions as in A.

C—By way of comparison, PA 11 powder having an inherent viscosity of 0.90 was applied.

D—By way of comparison, a powder composition based on PA 11 having an inherent viscosity of 0.90 and containing 13.5% by weight of blocked phenolic resins was applied electrostatically and under the same conditions.

The adhesiveness and spreading results obtained for Tests A to D are reported in Table IV.

TABLE I

| Example No. | Class of Adhesiveness | Class of Spreading | Epoxy/Sulfonamide resin PA + additives (% by weight) | Powder Preparation | Application type and polarity |
| --- | --- | --- | --- | --- | --- |
| 1A | 3 | 4 | 3 | dissolving | ES(−) |
| 1B | 3 | 4 | 3 | dissolving | ES(+) |
| 2A | 3 | 4 | 3 | dissolving | ES(−) |
| 2B | 3 | 4 | 3 | dissolving | ES(+) |
| 3A | 4 | 4 | 3 | melt-blending | ES(−) |
| 3B | 3 | 4 | 3 | melt-blending | ES(+) |
| 4A | 3 | 3 | 3 | melt-blending | ES(−) |
| 4B | 3 | 3 | 3 | melt-blending | ES(+) |
| 5A | 4 | 4 | 3 | dry mixing | ES(−) |
| 5B | 4 | 4 | 3 | dry mixing | ES(+) |
| 6A | 4 | 4 | 3 | dry mixing | ES(−) |
| 6B | 4 | 4 | 3 | dry mixing | ES(+) |
| 7A | 0 | 1 | 0 | | ES(−) |
| 7B | 0 | 1 | 0 | | ES(+) |
| 8A | 2 | 3 | 13.5% of phenolic resine | dry mixing | ES(−) |
| 8B | 2 | 4 | 13.5% of | dry mixing | ES(+) |

TABLE I-continued

| Example No. | Class of Adhesiveness | Class of Spreading | Epoxy/Sulfonamide resin PA + additives (% by weight) | Powder Preparation | Application type and polarity |
|---|---|---|---|---|---|
| | | | phenolic resins | | |

ES = electrostatic spraying

TABLE II

| Example No. | Class of Adhesiveness | Class of Spreading | Epoxy/sulfonamide resin PA & additives (% by weight) | % by weight of additives | Application type and polarity |
|---|---|---|---|---|---|
| 9A | 4 | 4 | 3 | 0.75 | ES(−) |
| 9A | 2 | 4 | 3 | 0.75 | ES(+) |
| 9B | 4 | 4 | 3 | 31.2 | ES(−) |
| 9B | 4 | 4 | 3 | 31.2 | ES(+) |
| 9C | 4 | 4 | 3 | 41.5 | ES(−) |
| 9C | 4 | 4 | 3 | 41.5 | ES(+) |
| 9D | 3 | 4 | 3 | 14.7 | ES(−) |
| 9D | 3 | 4 | 3 | 14.7 | ES(+) |
| 9B | 4 | 4 | | 32.6 | ES(−) |
| 9E | 4 | 4 | 3 | 32.6 | ES(+) |

TABLE 3

| Example No. | Class of Adhesiveness | Class of Spreading | Epoxy/sulfonamide resin PA + additives (% by weight) | Application type and polarity |
|---|---|---|---|---|
| 10A | 0 | 1 | 0 | ES(−) |
| 10A | 0 | 1 | 0 | ES(+) |
| 10B | 3 | 3 | 1 | ES(−) |
| 10B | 2 | 2 | 1 | ES(+) |
| 10C | 4 | 4 | 3 | ES(−) |
| 10C | 4 | 4 | 3 | ES(+) |
| 10D | 4 | 4 | 5 | ES(−) |
| 10D | 4 | 4 | 5 | ES(+) |

TABLE IV

| | ADHESIVENESS CLASS | | | | | | | |
|---|---|---|---|---|---|---|---|---|
| | EXAMPLE 11A | | EXAMPLE 11B | | EXAMPLE 11C | | EXAMPLE 11D | |
| | Application type and polarity | | | | | | | |
| Substrate | ES(+) | ES(−) | ES(+) | ES(−) | ES(+) | ES(−) | ES(+) | ES(−) |
| CHF$_2$=CHF degreased steel | 1.5 | 2.5 | 4 | 4 | 0 | 0 | 2 | 2 |
| shot-blasted degreased steel | 4 | 3.5 | 4 | 4 | 1 | 1 | 2 | 2.5 |
| iron phosphate-treated steel | 3 | 3.5 | 4 | 4 | 0 | 0 | 1 | 1 |
| zinc phosphate-treated steel | 3 | 4 | 4 | 4 | 0 | 0 | 1 | 1 |
| chromated aluminum | 2 | 2.5 | 3.5 | 3.5 | 0 | 0 | 1 | 1 |

EXAMPLE 12

Powder of an average particle size ranging from 80 to 200 μm was placed in a fluidized bed dip-coating vessel.

This powder was fluidized by a compressed gas delivery under the porous base of the vessel.

The shot-blasted steel substrate to be coated was preheated in a ventilated oven until it attained a temperature of approximately 240°–260° C.

The substrate was immersed in the bath of fluidized powder for 4 to 6 seconds and it was then removed and permitted to cool to room temperature.

The powder employed was PA 11, white-colored PA 11 and PA 12 (Sample A, B and C, respectively) containing 0% or 3% of epoxy/sulfonamide resin having a weight-average molecular weight Mw=1,200 and a glass transition temperature Tg=54° C.

The adhesiveness of the coatings produced was measured after 15 days in open air according to the test described in Example (1)(C)(2).

The results obtained are reported in Table V:

TABLE V

| Epoxy/sulfonamide PA + additives (% by weight) | ADHESIVENESS | | |
|---|---|---|---|
| | EXAMPLE 12A | EXAMPLE 12B | EXAMPLE 12C |
| 0 | Class 1 | Class 1 | Class 2 |
| 3 | Class 3 | Class 3 | Class 3 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermoplastic powder composition of matter, comprising intimate admixture of particulates of (a) at least one polyamide, polyetheresteramide or combination thereof, and an effective amount of (b) at least one epoxy/sulfonamide resin, which is the reaction product of at least one epoxy compound and at least one sulfonamide compound, to provide a thermoplastic composition capable of effectively wetting the surface of a metal substrate upon coating thereof.

2. The thermoplastic powder composition as defined by claim 1, wherein the ratio of weight of said at least one epoxy/sulfonamide resin to said at least one polyamide and/or polyetheresteramide ranges from 0.5% to 20%.

3. The thermoplastic powder composition as defined by claim 2, said ratio by weight ranging from 2% to 7%.

4. The thermoplastic powder composition as defined by claim 1, comprising (a) polyamide 11, polyamide 12, or mixture or copolymerizate thereof.

5. The thermoplastic powder composition as defined by claim 1, having a particle size ranging from 5 μm to 1 mm.

6. The thermoplastic powder composition as defined by claim 2, said ratio by weight ranging from 1.5% to 7.5%.

7. The thermoplastic powder composition as defined by claim 2, said ratio by weight ranging from 1% to 5%.

8. The thermoplastic powder composition as defined by claim 1, wherein (a) comprises a polyamide having an inherent viscosity, measured in meta-cresol at 20° C., ranging from 0.20 to 2.0 dl/g.

9. The thermoplastic powder composition as defined by claim 1, said at least one epoxy compound comprising the reaction product of bisphenol A with epichlorohydrin.

10. The thermoplastic powder composition as defined by claim 1, said at least one epoxy/sulfonamide resin having a melting point ranging from 50° to 180° C.

11. The thermoplastic powder composition as defined by claim 1, said at least one epoxy/sulfonamide resin having a weight-average molecular weight ranging from 500 to 10,000.

12. The thermoplastic powder composition as defined by claim 1, comprising (a) an aliphatic polyamide.

* * * * *